United States Patent
Zeleniak et al.

(10) Patent No.: US 12,045,131 B2
(45) Date of Patent: Jul. 23, 2024

(54) READ ERROR INJECTION

(71) Applicant: SK hynix Inc., Gyeonggi-do (KR)

(72) Inventors: Dmitri Zeleniak, Minsk (BY); Pavel Chertkov, Minsk (BY); Valery Abramov, Minsk (BY); Sergei Peniaz, Minsk (BY); Sergei Musin, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/065,564

(22) Filed: Dec. 13, 2022

(65) Prior Publication Data

US 2024/0193039 A1 Jun. 13, 2024

(51) Int. Cl.
*G06F 11/10* (2006.01)
*G06F 11/27* (2006.01)
*G06F 11/30* (2006.01)

(52) U.S. Cl.
CPC .......... *G06F 11/1048* (2013.01); *G06F 11/27* (2013.01); *G06F 11/3037* (2013.01)

(58) Field of Classification Search
CPC ... G06F 11/1048; G06F 11/3037; G06F 11/27
See application file for complete search history.

(56) References Cited

U.S. PATENT DOCUMENTS

| | | | |
|---|---|---|---|
| 8,108,759 B2 | 1/2012 | Moon et al. | |
| 8,677,187 B2 | 3/2014 | Zhang et al. | |
| 9,015,499 B2 | 4/2015 | Grube et al. | |
| 9,195,555 B2 | 11/2015 | Kalayci | |
| 9,235,488 B2 | 1/2016 | Norrie | |
| 9,542,287 B1 | 1/2017 | Jean | |
| 9,564,239 B2 | 2/2017 | Cai et al. | |
| 10,665,310 B2 | 5/2020 | Li et al. | |
| 11,037,639 B2 | 6/2021 | Her et al. | |
| 11,770,133 B1* | 9/2023 | Asadi | H03M 13/116 714/704 |
| 2013/0096902 A1* | 4/2013 | Bose | G01R 31/31816 703/14 |
| 2018/0039578 A1* | 2/2018 | Yun | G06F 3/0653 |
| 2018/0173432 A1* | 6/2018 | Han | G06F 3/0673 |
| 2021/0181952 A1* | 6/2021 | Han | G06F 3/0679 |
| 2022/0091779 A1* | 3/2022 | Kim | G11C 16/34 |

OTHER PUBLICATIONS

Stenfort, R., et al., "NVMe Cloud SSD Specification," Version 1.0 (Mar. 18, 2020), Open Compute Project, 2020, pp. 1-72, URL: https://www.opencompute.org/documents/nvme-cloud-ssd-specification-v1-0-3-pdf.
Wikipedia: The Free Encyclopedia, "Fault injection," Oct. 30, 2022 [19:20], 10 pages, URL: https://en.wikipedia.org/w/index.php?title=Fault_injection&oldid=1119107577.

* cited by examiner

*Primary Examiner* — Guy J Lamarre
(74) *Attorney, Agent, or Firm* — Weaver Austin Villeneuve & Sampson LLP

(57) ABSTRACT

Techniques for injecting memory read errors may include obtaining an error injection profile from a test library. A defense level in the defense hierarchy can be selected for execution according to the probabilities in the error injection profile. One or more errors can be injected into read operations of the storage device according to the defense-level read retry vector of the selected defense level, and a defense algorithm of the selected defense level is executed to recover read data of the read operations.

20 Claims, 7 Drawing Sheets

READ ERROR INJECTION

BACKGROUND

Memory systems including those implemented with non-volatile memory (e.g., solid-state drives (SSD) or flash-based mobile storage) can provide fault tolerance using both hardware (HW) and firmware (FW) components. Like any fault tolerance systems, there can be a certain limit of error tolerance provided by the device. The reliability and endurance on certain operating conditions and target performance (e.g., latency/throughput) can be specified by a device manufacturer.

BRIEF DESCRIPTION OF THE DRAWINGS

Various embodiments in accordance with the present disclosure will be described with reference to the drawings, in which.

BRIEF SUMMARY

Figure 1:
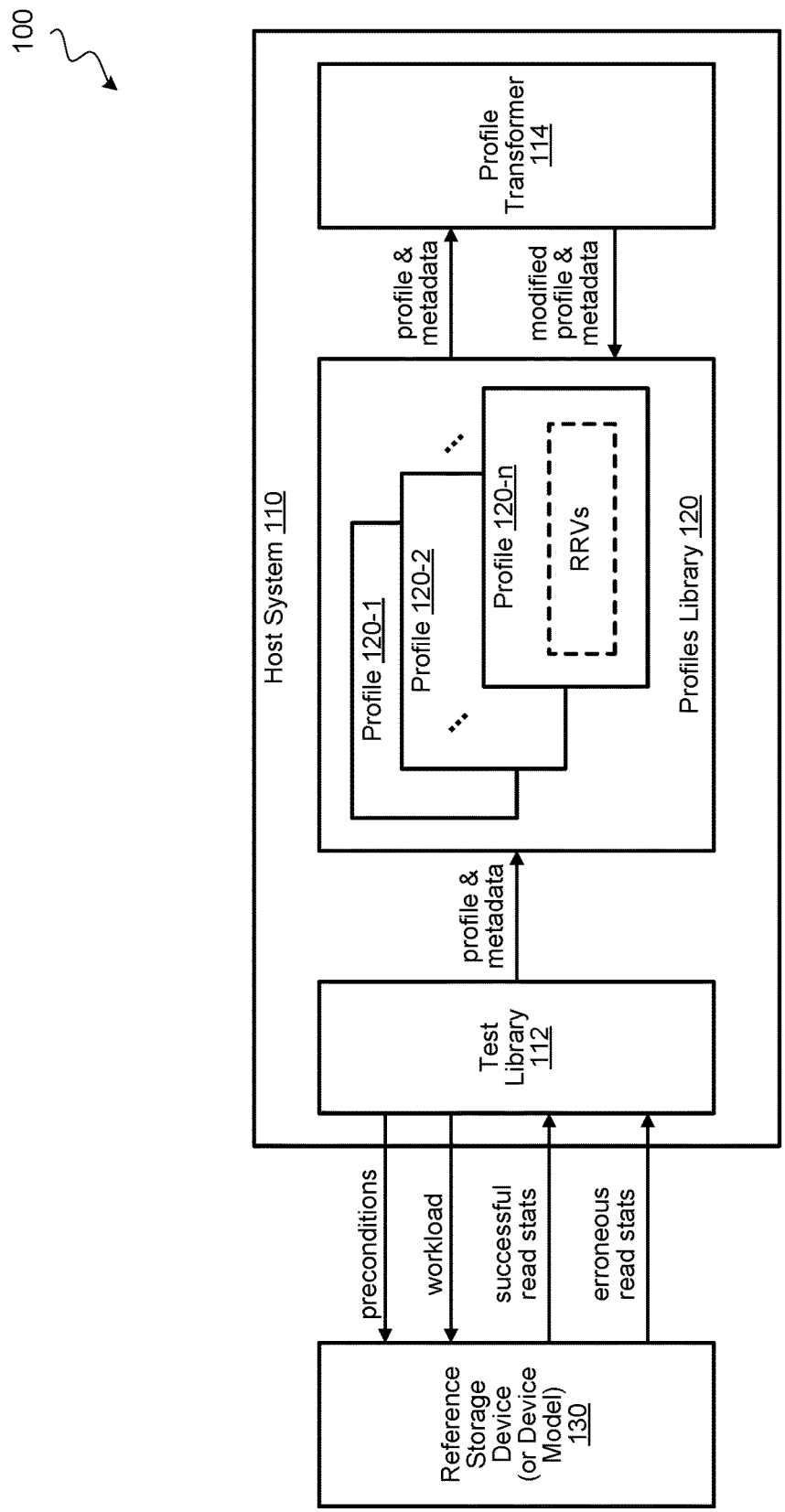
FIG. 1 illustrates an example of an operating environment for generation of error injection profiles, according to some embodiments.

Techniques for injecting memory read errors during testing of a storage device (or simulation of a device model) may include obtaining an error injection profile from a test library. The error injection profile may contain read retry vector information including a hierarchal read retry vector, and a defense-level read retry vector for each defense algorithm in the defense hierarchy. The hierarchal read retry vector may include probabilities including a probability of successful read without executing a defense algorithm, and a probability of successful data recovery for each defense algorithm of the defense hierarchy implemented for the storage device. A defense level in the defense hierarchy can be selected for execution according to the probabilities in the hierarchal read retry vector. One or more errors can be injected into read operations of the storage device according to the defense-level read retry vector of the selected defense level, and a defense algorithm of the selected defense level is executed to recover read data of the read operations.

In some implementations, a non-transitory computer readable storage medium can store machine instructions, which when executed by a storage device, cause the storage device to perform operations for error injection. The machine instructions can be, for example, firmware of a storage device. The operations for error injection may include selecting an error injection profile from a test library and selecting a defense level in the defense hierarchy to execute. One or more errors can be injected into read operations of the storage device according to the defense-level read retry vector of the selected defense level, and a defense algorithm of the selected defense level can be executed to recover read data of the read operations.

In some implementations, a storage device having a memory and a read operation controller may also include an error injector. The read operation controller is operable to set read parameters of the memory, perform read operations in response to read requests from a host system, and perform read recovery operations according to a defense hierarchy that includes a plurality of defense algorithms to recover erroneous data read from the memory. The error injector is operable to obtain an error injection profile from a test library, and inject one or more errors during the read operations by modifying a read parameter or a read command result status based on read retry vector information of the error injection profile. The read retry vector information may include a hierarchal read retry vector containing a probability of successful read without executing a defense algorithm, and a probability of successful data recovery for each of the defense algorithms in the defense hierarchy.

DETAILED DESCRIPTION

During operation of a memory system, the storage device (e.g., flash memory) goes through its life cycle stages from Start-of-Life to End-of-Life. At the End-of-Life stage, the probability of errors during read from device is increased. Such probability can be hard to predict accurately, due to its complex dependency on device operation conditions.

To achieve a certain level of reliability, a memory controller can fetch/read data through encoder/decoder based on Error Correcting Code (ECC) such as Low-Density Parity Check Code (LDPC) and other codes. To improve device performance characteristics and increase the chances of successful data recovery using minimal time, Defense Algorithms (DAs) can be implemented in both HW and FW. These algorithms (e.g., History Read, eBoost, etc.) can be used to obtain the appropriate levels of read threshold voltage to obtain the correct data. Such levels are usually hard to predict and depend on various factors (e.g., operation temperature, data retention time, and aging). Each DA may take a fixed or variable number of steps, which can affect the latency of the device. Since latency is one of the performance metrics of the device, in addition to recovering the correct data, execution of the DAs is also performed within the latency requirements of the device.

To verify the implementation of DAs and other algorithms by a device manufacturer, error injection can be performed as part of checking the memory system for compliance with the memory specification. Injection can be performed to specific address location with immediate or delayed error propagation. Due to the complicated nature of how errors occur in a real memory system, making injection realistic with existing methods can be a challenging task. This can be especially challenging for long running performance tests and massive errors occurrence, which normally happens at late stages of a device lifetime. To verify the full capabilities of the DAs, in addition to testing realistic scenarios, testing can also be performed to cover artificial cases, for example, when errors occur in context with other algorithms or certain extreme device operation conditions.

In the following description, for the purposes of explanation, specific details are set forth in order to provide a thorough understanding of certain inventive embodiments. However, it will be apparent that various embodiments may be practiced without these specific details. The figures and description are not intended to be restrictive.

Techniques for error injection when testing memory systems are described. The error injection techniques can flexibly support white-box testing (storage device aware of injection) on an actual device or a device model in simulation, and/or black-box testing (storage device unaware of injection) on a device model in simulation. Errors are injected based on probability distribution, which can be recorded from a reference storage device or from a model. Appropriate test length can be chosen for desired frequency of read errors of certain types. The probability distribution can also be modified off-line based on predefined transformations when the storage device is not in operation, and/or online during operation of the storage device according to natural errors occurring on storage device under test and other internal events. The error injection techniques can be used with various error activation methods such as read bias modification or data corruption.

Unlike existing approaches, the error injection techniques disclosed herein allows flexibly varying injection from realistic cases to artificial cases based on the testing needs at different product development stages. As a result, testing becomes more robust to algorithms changes and easier to maintain. Another flexibility is achieved by variation of injection on a real device and simulator, which allows adding injection for a target product early in the development stage, and then later increasing injection capability not only during product development, but also in the product maintenance phases.

The error injection techniques disclosed herein can be based on collecting probability distributions of read operation successes and fails on a reference storage device, and then later reproducing errors on a storage device under test. Error probability distribution is represented as a Read Retry Vector (RRV). RRVs are used to structurally describe the probability distributions of errors which occur during read operations in storage device memory. A RRV can take into account the severity of the error and the stages of the DA implemented on a storage device. A RRV can be constructed as a 2-level nested structure, where the top level gives probabilities of successful data recovery by each DA, and the bottom level describes how many read attempts are used by each DA.

Consider a defense flow consist of N number of Defense Algorithms (DAs). The i-th DA (i=$\overline{1,N}$) can perform a variable number $n_i$ of read operations, $n_i \in \{1, \ldots, N_i\}$. The event of successful read from the first attempt (without DA) is denoted as $A_0$, the event of successful read by the i-th DA is denoted as $A_i$, i=$\overline{1,N}$. Let $$\vec{R} = (R_0, R_1, \ldots, R_N) = \left(\mathbb{P}\{A_0\}, \mathbb{P}\{A_1 \cap \overline{A}_0\}, \ldots, \mathbb{P}\left\{A_N \cap \bigcap_{k=0}^{N-1} \overline{A}_0\right\}\right)$$

$$(0 < R_i \le 1, i = \overline{0,N})$$

represents the top-level RRV. In this case, the probability of an uncorrectable error (UECC) that the set of DAs is unable to recover is $R_{UECC}=R_{N+1}=1-\Sigma_{i=0}^{N} R_i \ge 0$. The probability of a successful read of the i-th DA from the j-th attempt is denoted by $$R_{ij}^+ = \mathbb{P}\left\{n_i = j \mid A_i \cap \bigcap_{k=0}^{i-1} \overline{A}_k\right\}, 0 \le R_{ij}^+ \le 1, R_{iN_i}^+ > 0, \sum_{j=1}^{N_i} R_{ij}^+ = 1,$$

$i = \overline{1,N}, j = \overline{1,N_i}.$

The number of performed failed attempts in the case of unsuccessful read operation of the i-th DA have a probability distribution of $$R_{ij}^- = \mathbb{P}\left\{n_i = j \mid \bigcap_{k=0}^{i} \overline{A}_k\right\}, 0 \le R_{ij}^- \le 1, R_{iN_i}^- > 0, \sum_{j=1}^{N_i} R_{ij}^- = 1,$$

$i = \overline{1,N}, j = \overline{1,N_i}.$

This means that the bottom-level RRVs for the i-th DA are $$\vec{R}_i^+ = (R_{i1}^+, \ldots, R_{iN_i}^+), \vec{R}_i^- = (R_{i1}^-, \ldots, R_{iN_i}^-), i=\overline{1,N}.$$

The error injection techniques utilize error injection profiles prepared for certain test conditions, which are later passed to the storage device under test. An error injection profile can include an array of RRVs (as described above) for all cell types supported by storage device, and a threshold value of acceptable deviation between errors injected according to the RRV and actual errors occurring after injection. The error injection profiles can be generated and stored in a profiles library by via a test library module executed by a host system interacting with a reference storage device.

FIG. 1 illustrates an example of an operating environment 100 for generation of error injection profiles. The operating environment 100 may include a host system 110 coupled to a reference storage device 130. Reference storage device 130 can be a physical storage device that can receive and process host commands such as read, write/program, and erase commands from host system 100 to access the memory components (e.g., flash memories such as NAND flash) of reference storage device 130. In some implementations, reference storage device 130 can be a storage device model loaded in a simulation executing on host system 100.

Host system 110 can be a computing device (e.g., a computer) that can perform memory access operations on reference storage device 130. Host system 110 may include a test library module 112, a profiles library 120, and a profile transformer 114. Test library module 112 provides an interface between host system 110 and reference storage device 130, and can be used to apply certain preconditions to reference storage device 130 to obtain an error injection profile. For example, the preconditions may include one or more of a life stage of the device (e.g., start-of-life, end-of-life, etc.) by performing a number of program/erase cycles on reference storage device 130, a data retention time by storing data on reference storage device 130 for a period of time (e.g., a number of days), or other conditions that can contribute to the likelihood of read errors. In some implementation, host system 110 can also control test equipment to subject reference storage device 130 to environmental preconditions such as controlling the temperature (e.g., high, normal, low) of a chamber that reference storage device 130 is placed in. After the set of preconditions (e.g., life stage, retention time, and/or temperature, etc.) for a specific error injection profile has been applied to reference storage device 130, test library module 112 can run test workloads and gather statistics on successful and erroneous reads from reference storage device 130. Read success and read error probabilities, as well as metadata describing the preconditions can be saved as components of a RRV for the target error injection profile in profiles library 120.

Profiles library 120 is used to store error injection profiles that can be applied to a storage device under test. For example, profiles library 120 may store error injection profiles 120-1 to 120-n. Each error injection profile may correspond to a set of preconditions. An error injection profile may include a RRV including success and error probabilities for each of various read operation types. For example, for a NAND flash memory-based storage device, the read operation types may include single-level cell (SLC), multi-level cell (MLC), tertiary-level cell, quad-level cell (QLC), etc., and an error injection profile may include a RRV for each of these read operation types. A separate RRV is used for each read operation type because the different read operation types can have different error probability distributions.

Figure 2:
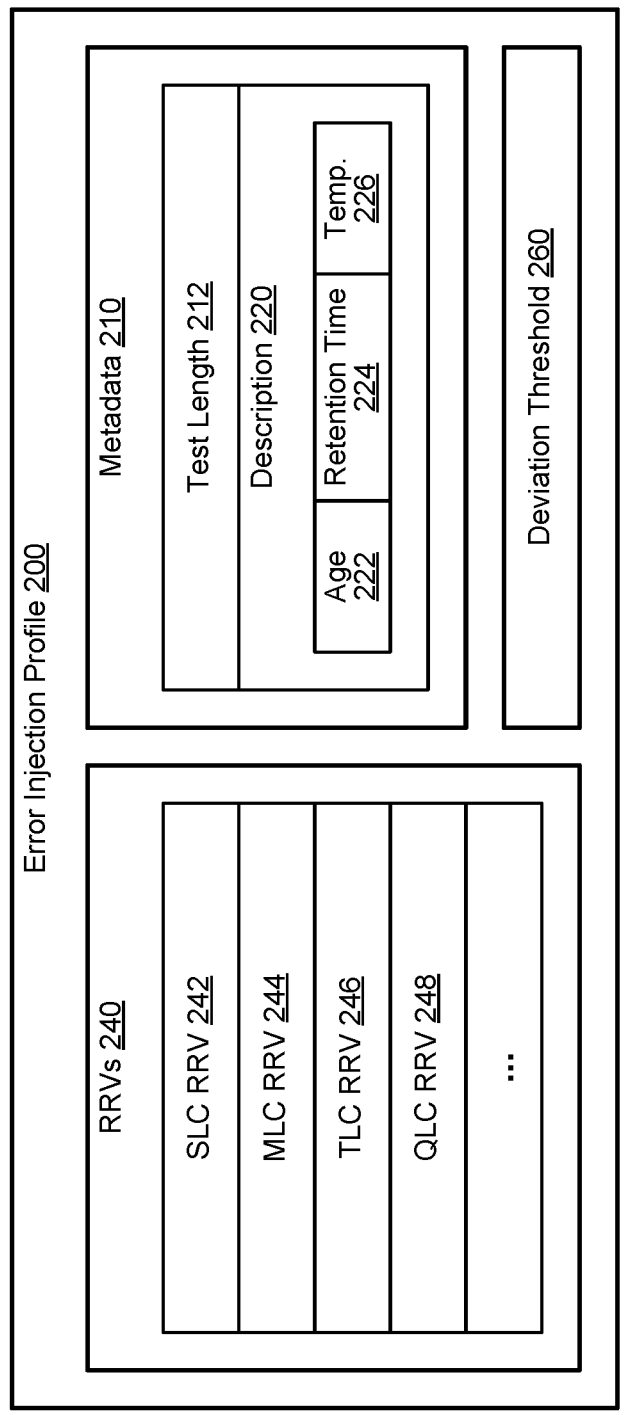
FIG. 2 illustrates an example of the contents of an error injection profile, according to some embodiments.

FIG. 2 illustrates an example of the contents of an error injection profile 200. As discussed above, each error injection profile 200 may correspond to a set of operating preconditions. To identify an error injection profile, error injection profile 200 can be linked to or contain metadata 210. Metadata 210 may include a test length 212 and a profile description 220. Test length 212 indicates the number of commands that were applied to reference storage device 130 to obtain the RRVs in error injection profile 200. Test length 212 can be used when applying error injection profile 200 to a device under test to adjust for naturally occurring errors (to be further described below).

Profile description 220 may include information about the preconditions that were applied to reference storage device 130 to obtain the RRVs and other information. Profile description 220 can be represented in a readable text format. The information included in profile description 220 may include age 222, retention time 224, temperature 226, and/or other parameters. Each parameter may have a certain numeric value. For example, age 222 can have a numeric value representing the number of program/erase cycles such as 0 cycles, 1000 cycles, 2000 cycles, . . . , 15000 cycles, etc.; retention time 224 can have a numeric value representing the number of days the data have been stored such as 0 days, 30 days, 90 days, etc.; and temperature 226 can have a numeric value representing the operating environment temperature in degrees such as 30 C, 40 C, 50 C, . . . , 100 C, etc. Alternatively, any of the parameters can take on a contextual name. For example, age 222 can be represented as "start-of-life" (e.g., corresponding to 0 cycles), "middle-of-life" (e.g., corresponding to 7000 cycles), or "end-of-life" (e.g., corresponding to 15,000 cycles), etc.; retention time 224 can have be represented as "new data" (e.g., corresponding to 0 days) or "old data" (e.g., corresponding to 1,000 days), etc.; and temperature 226 can be represented as "low temperature" (e.g., corresponding to −30 C), or "high temperature" (e.g., corresponding to 100 C), etc. In some implementations, the profile description 220 can be represented as a triplet such as {start-of-life, old data, low temperature}, {end-of-life, new data, high temperature}, etc.

Error injection profile 200 also includes a set of RRVs 240. As discussed above, error injection profile 200 may include a RRV for each of various read operation types. Hence, error injection profile 200 may include a SLC RRV 242 for single-level cells, a MLC RRV 224 for multi-level cells, a TLC RRV 246 for tertiary-level cells, a QLC RRV 248 for quad-level cells, etc. Error injection profile 200 can also include a deviation threshold 260. Because it is possible that errors occur naturally during testing of a device, the deviation threshold 260 provides an acceptable number of errors that may still allow the test to pass to account for the naturally occurring errors.

Referring back to FIG. 1, host system 110 may also include an optional profile transformer 114. Profile transformer 114 can be used to create a new error injection profile by reading an error injection profile and its metadata from profiles library, and artificially modifying the RRVs for certain test purposes by scaling or mutating the success and error probabilities. The modified error injection profile and metadata can be stored as a new error injection profile in profiles library 120. In some implementations, profile transformer 114 can also create an error injection profile from scratch without relying on existing RRVs.

As described above, reference storage device 130 need not be a physical storage device, but can instead be a storage device model. The storage device model can be loaded in a simulation to produce read statistics for specific real life or artificial test conditions, and there can be different model parameters for different operating conditions (e.g., different temperature). The storage device model can evaluate read retry probabilities based on the shapes of threshold voltage distributions of the memory cells under different conditions and error recovery ECCs and DAs.

Figure 3:
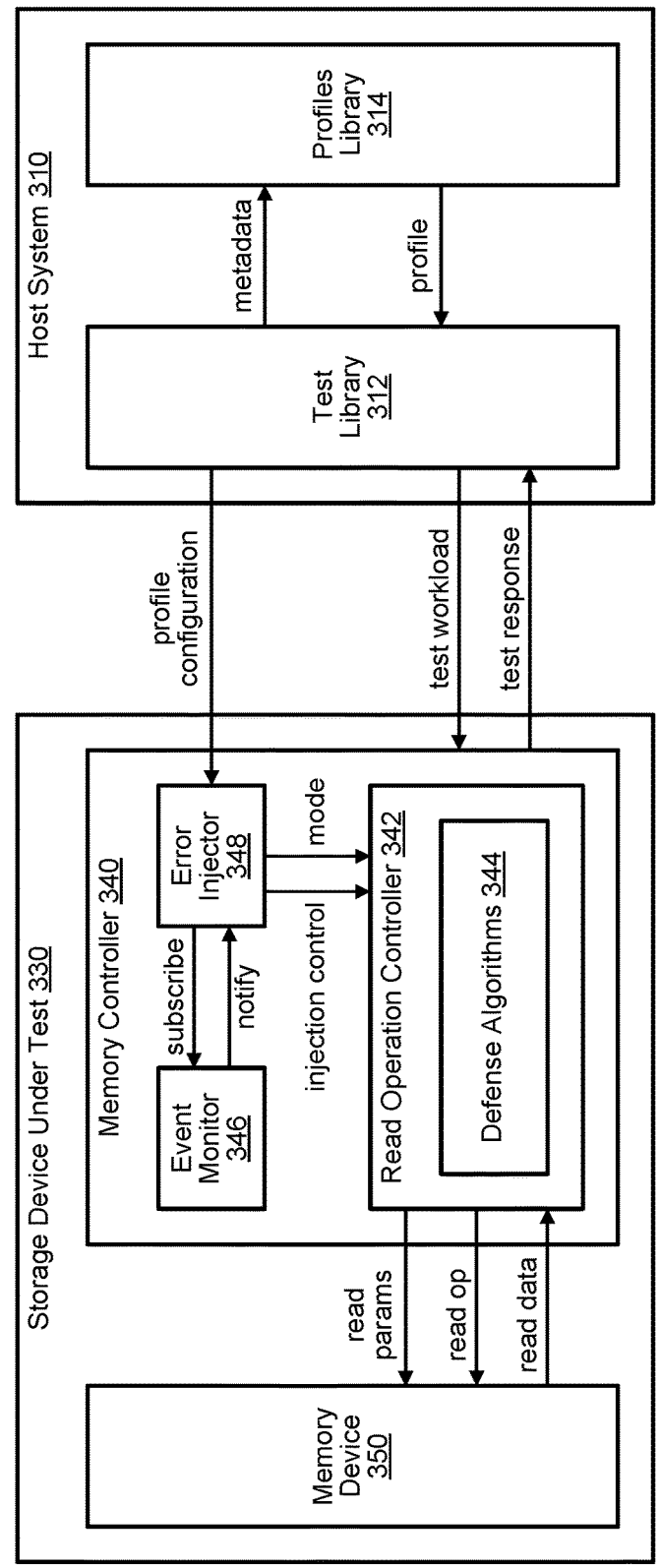
FIG. 3 illustrates an example of a test environment for white-box testing of a storage device, according to some embodiments.

FIG. 3 illustrates an example of a test environment 300 for white-box testing of a storage device. Test environment 300 includes a host system 310 and a storage device under test 330. Host system 310 can be, for example, host system 110 or a similar computing system. Host system 310 may include a test library module 312 that interfaces with storage device under test 330, and a profiles library 314 containing one or more error injection profiles. Host system 310 need not be the same system that generated the error injection profiles. For example, the error injection profiles can be generated in one host system, and the error injection profiles can be copied from that host system into profiles library 314 of host system 310.

For white-box testing, storage device under test 330 can be a physical storage device or a storage device model. Storage device under test 330 may include a memory controller 340 coupled to a memory device 350 (or corresponding models). Memory device 350 includes memory cells for storing data from host system 310. Memory device 350 can be implemented, for example, using flash memories (e.g., NAND flash) or other types of memories. In some embodiments, memory device 350 can be implemented using a combination of different types of memories (e.g., flash and DRAM). The flash memories implemented in memory device 350 may also include different types of memory cells such as SLC and MLC, etc.

Memory controller 340 can include a read operation controller 342, an error injector 348, and an optional event monitor 346 implemented using hardware, firmware, or a combination of both. Memory controller 340 may include other components not specifically shown such as a program/erase operation controller, a flash translation layer to perform address translation, a background task manager to perform background tasks such as wear-leveling, garbage collection, etc. Read operation controller 342 is used to perform read operations on memory device 350. Read operation controller 342 may implement a set of defense algorithms (DAs) 344 that can be invoked to correct errors in the data obtained from memory device 350. The set of DAs can have a hierarchal order in which lower latency and/or less processing intensive algorithms are prioritized over longer latency and/or more processing intensive algorithms. Each successive DA can be invoked when the prior DA is unable to recover the correct data.

Memory controller 340 also includes an error injector 348 and an optional event monitor 346. Error injector 348 is used to verify the DAs and other algorithms implemented in memory controller 340 of storage device under test 330 operating in the presence of errors. For white-box testing in which the DA flow is adapted for error injection, error injector 348 is implemented in memory controller 340. An error injection profile can be selected by test library module 312 from profiles library 314 according to the testing conditions. After profile selection, test library module 312 can configure error injection 348 with an active profile using the memory controller interface (e.g., using vendor host commands). Error injector 348 performs error injections at the time when read operation controller 342 receives the data from memory device 350. Error injector 348 makes decisions on injection and removing already injected errors, according to applied active profile.

The active profile configured in error injector 348 can be replaced or changed for specific testing purpose at any moment. A new profile can be applied in response to internal events in memory controller 340 of storage device under test 340. For example, error injector 348 can subscribe to certain events being monitored by event monitor 348. Internal events can be registered in event monitor 348, and event monitor may store a mapping of events to profiles in a mapping table, where the key to an entry in the table is equal to the internal event name and the value equals a modified profile (e.g., {eventname1: Profile1, eventname2: Profile2}). When a subscribed internal event is detected, the active profile configured in error injector 348 be changed to another profile based on the mapping. A default profile can also be defined in the mapping table. Application of an error injection profile based on an internal event is useful, for example, to test specific firmware/hardware stages separately. Event monitor 348 can also be used to prevent error injections in certain firmware/hardware stages.

A more detailed description of the operation of test environment 300 will now be described. Test library module 312 of host system 310 may begin a storage device test by obtaining an error injection profile from profiles library 314 using metadata (e.g., age, retention time, and/or temperature) associated with the profile. Test library module 312 may enable and configure the error injector 342 with the error injection profile obtained from profiles library 314. Error injector 342 may subscribe to internal events from event monitor 346. Memory controller 340 may fetch a read command from hosts system 310, and determine if error injector 348 is enabled. If error injector 348 is not enabled, the read command is executed by read operation controller 342 in the normal mode of operation, and the defense algorithms 344 can be invoked in the normal manner when an uncorrectable error is encountered.

If error injector 348 is enabled, read operation controller 342 is set in error injection mode, and error injector 348 obtains the RRVs corresponding to the read operation (e.g., for the read operation type). Error injector 348 then applies the successful RRV to get the defense algorithm stage and read attempt. Depending on the RRV of the defense algorithm, if no error injection is to be performed for the read attempt, the read operation is marked for a successful read in the read operation context, and the read is sent to memory device 350. Memory device 350 provides the read data to memory controller 340. If the read operation results in no errors or the error is corrected using ECC, the read operation is a successful read, and the memory device test continues if there are additional read operations remaining in the test.

Returning to the processing above, if the error injection is to be applied to the current read operation, the read operation can be marked for an unsuccessful read in the read operation context. Error injector 348 can set the number of unsuccessful read retry attempts before reaching a successful read retry attempt, set the number of unsuccessful defense stages before reaching the successful defense stage, and override the read operation parameters (e.g., by applying an incorrect read voltage) to force an unsuccessful read result.

If the read data contains an uncorrectable error, read operation controller 342 obtains the unsuccessful defense stages count, the unsuccessful read retry count, and the successful defense stage from the read operation context, and set up the defense algorithms according to the count values from the read operation context. Read operation controller 342 then executes the defense algorithm at the current stage and performs one or more read retry attempts according to the defense algorithm. If corrected data is obtained as a result of executing the defense algorithm, the corrected data is provided to the memory controller, and the corrected data is provided to host system 310. If additional read attempts are needed, they can be performed according to the defense algorithm. If the defense algorithm has exhausted its read attempts without recovering the corrected data, the next defense algorithm in the hierarchy can be executed until all stages of the defense flow are complete. If the end of the storage device test is reached, statistics on the read attempts including successful and unsuccessful reads retries are provided to host system 310 as the test result.

Figure 4:
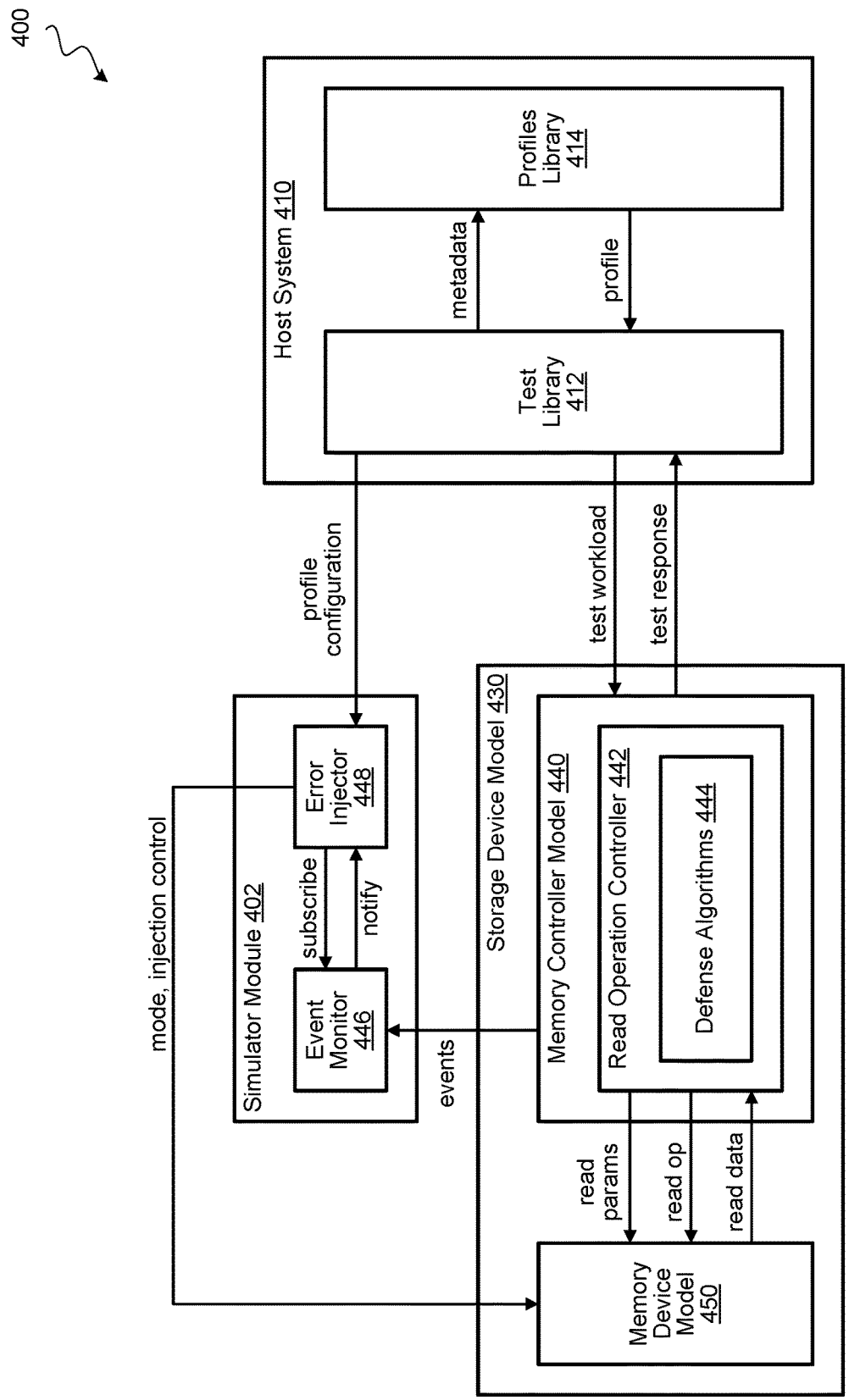
FIG. 4 illustrates an example of a test environment for black-box testing of a storage device model, according to some embodiments.

FIG. 4 illustrates an example of a test environment 400 for black-box testing of a storage device model. For black-box testing, the defense algorithm flow is unaware of the error injection. This kind of injection is possible while testing a storage device model in simulation. In contrast to white-box testing, error injection is performed directly to the memory device model, and the injection configuration can be performed using simulator API calls.

Test environment 400 may include a host system 410, a storage device model 430, and a simulator module 402. Similar to host system 310, host system 410 may include a test library module 412 and a profiles library 414. Storage device model 430 may include a memory device model 450 coupled to a memory controller model 440. Memory controller model 440 may include a read operation controller 442 implementing defense algorithms 444, as well as other components not specifically shown. The functionalities of the components of host system 410, memory device model 450, and read operation controller 444 are similar to those discussed above with respect to test environment 300, and thus a detail description of which need not be repeated.

Simulator module 402 includes error injector 448 and an optional event monitor 446. Unlike test environment 300, these components are not part of the memory controller, but are part of the simulator (e.g., a simulator add-on feature or component). This allows the error injection to be performed directly into memory device model 450 such that memory controller model 440 is not aware of the error being injected. The general flow for black-box testing is similar to that described above, except memory controller model 440 is not responsible for obtaining the error injection profile, and does not control the error injection. Instead, the error injection control and the processing of the error injection profile are performed by simulator module 402. In some implementations, simulator module 402 can be integrated into storage device model 430.

Additional details of implementing error injection on a storage device under test will now be described. The error injection can be based on firmware running in the memory controller. The defense hierarchy implemented in firmware may include multiple stages that the firmware traverses through while attempting to recover uncorrectable errors. For example, a defense hierarchy may include multiple defense algorithms including History Read that attempts to read the data using the last successful read parameters, Read Retry that attempts to read the data using modified read params, eBoost that attempts to find the optimal read reference voltage, as well as other defense algorithms. If the History Read stage fails to recover the error, the firmware proceeds to the Read Retry stage. If the Read Retry stage cannot recover the error, the firmware invokes the eBoost algorithm, and so on. Different stages of the defense hierarchy can have their own firmware flows, ways to interact with hardware, and error correction capabilities. In addition to the defense stages, the transition from stage to stage and further handling of recovered data are also aspects of the defense hierarchy flow for consideration.

New memory devices typically do not encounter many bit-flips, so the majority of uncorrectable errors can be recovered by the History Read and Read Retry stages, and the deeper stages of the defense hierarchy are not invoked. On the other hand, a significantly large number of bit-flips can cause all stages of the defense hierarchy to fail. Implementing an error injection module can provide the capability to check whether a particular stage is capable of uncorrectable error recovery, and to verify the transition between the different defense stages.

During read operation, the firmware can transmit voltages or voltage bias codes to the memory device (e.g., NAND flash). The memory device applies these voltages to retrieve data from the cells then puts the received data into a buffer (e.g., latch). Then, the data from the buffer is taken and analyzed. The analysis can be performed both by firmware and by specialized hardware components. The result of data analysis determines the number of bit-flips and sets the status of the read operation to an uncorrectable error (UECC), correctable error (ECC), or no error.

Error injection is performed at the moment of sending a request to the memory to read from the memory cells. At the moment of sending the read request to the memory device, the error injection module can change a read parameter such as the read voltage, read bias, read voltage offset, or other parameters (depending on the implementation). The read parameters in the read request are changed in such a way to cause an uncorrectable error resulting in the UECC status. The error injection can also be carried out by overriding the read command result status, for example, in simulation to generate a read error. It should be noted that the error injection does not corrupt the actual data being stored in memory. Instead, the error injection mechanism distorts the read operation to induce the memory controller to react as if an error has occurred.

When the UECC read status is obtained, the firmware will apply the defense algorithms. With the help of defense algorithms, the firmware attempts to recover the correct data. The error injection module can be programmed with information on the firmware defense flow such the error injection module can distinguish between the different stages of the defense hierarchy.

The purpose of applying the defense algorithms is to recover the data that could not be read after the first attempt. There can be several stages of defense algorithms, and each defense algorithm can also initiate several attempts or retries to read the data from the memory device. The number of reads within each defense stage need not be fixed in advance, and may vary depending on different physical processes.

The number of read attempts also depends on the bit-flips and the state of the received data on each subsequent read. A request for data from the memory device can be made both from the same memory cells and from adjacent/dependent memory cells. In other words, from read to read the total amount of additional read-retries during execution of the defense algorithms can be different. The error injection module is capable of distinguishing and navigating between the stages of the defense algorithms.

Each read operation can be tracked in the firmware. The error injection module can apply a profile to each read operation. Each profile contains the probability distribution of the read retry vector (RRV). Within one profile, different probability distributions can be specified for different read modes (SLC, FW_SLC, MLC, TLC, QLC, etc.). During each read operation, the corresponding RRV from the profile is applied. A random number generator uses the RRV probabilities to choose a random RRV element according to the probabilities inside the RRV. The error injection module decides whether to inject an error or not according to randomly chosen RRV element. In the case when it is necessary to inject an error, the error injection module injects the error and controls the defense algorithms in accordance with the specified probability distribution. In some implementations, the error injection can be integrated with the defense algorithm.

RRV-based error injection can be implemented in the firmware by using a random number generator or an events counter. In the first case, a pseudo random number generator (PRNG) can be used to generate a random value representing a number of attempts in accordance with some RRV (of any level), which is equivalent to a categorical probability distribution (generalized Bernoulli distribution):

| Nr   | 1     | ... | n     |
|------|-------|-----|-------|
| Prob | $P_1$ | ... | $P_n$ | with n=N+1, $P_i=R_i$, $i=\overline{1,N+1}$ for a top-level RRV, n=$N_i$, $P_j=R_{ij}^{\pm}$, $j=\overline{1,N_i}$ for bottom-level RRVs corresponding to i-th defense algorithm (DA). The PRNG can be implemented, for example, using Xorshift which is a non-cryptographically-secure PRNG with a very small code and state. For instance, a 32-bit version of Xorshift consists of 6 assembler commands and takes about 10 CPU cycles for every host read command.

For certain tests of the defense algorithms, if the random order of error occurrence in a sequence is inconsequential and only the frequency of errors matters, then the errors can be injected regularly at equal or almost equal time intervals. This alternative second option supposes that for a test of a given length L (in read commands), it is possible to inject errors based on counters. Due to 2-level nature of RRV and presence of success and fail bottom-level RRVs, 3 types of counters can be used for this option.

For the top-level RRV, top-level unconditional counters can be used. The error corresponding to success of the i-th DA or to UECC can be injected through equal intervals $$T_i = \lfloor 1/R_i \rfloor, \ i \in S := \{i : T_i \leq L, i=\overline{1,N+1}\},$$

counted by the j|i counter whose values are set to $T_i$ initially. The sets S describe DAs whose successful data recovery might be observed during the test of a given length L. Total |S| counters are decremented for every read operation. After reaching zero by the only one counter i at a certain moment, the error corresponding to this counter is injected, and this counter is initialized to $T_i$ again. If several counters i∈I reach zero at the same time, the error corresponding to the counter with a number $$\underset{i \in I}{\arg\max} T_i$$

is injected, and this counter is initialized to its start value. On the next read commands, remaining counters that reached zero can initiate corresponding error injections in order of descending $T_i$ and then be initialized to their start values. If the inequality $T_i > L$ holds for some $i = \overline{1, N+1}$, it means that the test is too short and the successful error recovery by the i-th DA ($i = \overline{1, N}$) or UECC (i=N+1) may not happen.

For the success bottom-level RRV, success bottom-level conditional counters can be used. The error recovered by the i-th DA from the j-th attempt can be injected through equal intervals $$T_{ij}^+ = \lfloor 1/R_{ij}^+ \rfloor,$$

$$j \in S_i^+ := \{j : R_{ij}^+ > 0, T_{ij}^+ T_i \le L, j = \overline{1, N_i}\},$$

$$i \in S \setminus \{N + 1\},$$

counted by the j|i-th conditional counter which values are set to $T_{ij}^\pm$ initially. The sets $S_i^+$ describe numbers of read retries needed for successful data recovery by the i-th DA which might be observed during the test of a given length L. Total $|S_i^+|$ conditional counters are decremented for every decrement of counter i. After reaching zero by the only one conditional counter j|i at a certain moment, the error corresponding to this counter is injected, and this counter is initialized to $T_{ij}^+$ again. If several conditional counters j|i∈$J_i$ reach zero at the same time, the error corresponding to the conditional counter with a number $$\underset{j|i \in J_i}{\arg\max} T_{ij}^+$$

is injected, and this counter is initialized to its start value. On the next decrements of counter i, remaining conditional counters that reached zero should initiate corresponding error injections in order of descending $T_{ij}^+$, and then to be initialized to their start values. If the inequality $T_{ij}^+ T_i > L$ holds, it means that the test is too short and the successful error recovery by the i-th DA (i∈S\{N+1}) from the j-th attempt may not happen.

For the fail bottom-level RRV, fail bottom-level conditional counters can be used over sets defines as $$S_{<i} := S \cap \{1, \ldots, i-1\}, S_{>i} := S \cap \{i+1, \ldots, N+1\}, i \in S.$$

Data recovery by the i-th DA can happen in the case of fail in data recovery by all previous DAs, because the firmware will travers the defense hierarchy to the next DA if the current and previous DAs fail to recover the error. Ultimately, an UECC can happen in the case of fail in data recovery by all available DAs. In order to determine a number of reads performed by all previous k number of DAs, with k∈$S_{<i}$ before their fails, conditional counters whose values are initially set to $$T_{kj}^- = \left\lfloor \frac{1}{R_{kj}^-} \right\rfloor, j \in S_k^- := \left\{ j : R_{kj}^- > 0, T_{kj}^- \sum_{l \in S_{>k}} T_l \le L, j = \overline{1, N_k} \right\},$$

$$k \in S_{<i}, i \in S$$

can be used. The sets $S_k^-$ describe numbers of read retries performed before fail of k-th DA which might be observed during the test of a given length L.

Total $\Sigma_{k \in S_{<i}} |S_k^-|$ conditional counters j|k∈$S_k^-$, k∈$S_{<i}$ in $|S_{<i}|$ groups of counters are decremented for every decrement of any counter i>k. If the only one conditional counter j|k is reaching zero in the k-th group of counters at a certain moment, the error corresponding to this counter is injected and this counter is initialized to $T_{kj}^-$ again. If several conditional counters j|k∈$J_k$ reach zero at the same time in some group of counters, the error corresponding to the conditional counter with a number $$\underset{j|k \in J_k}{\arg\max} T_{kj}^-$$

is injected, and this counter is initialized to its start value. On the next decrements of any counter i>k, remaining conditional counters that reached zero should initiate corresponding error injections in order of descending T j, and then to be initialized to their start values. If the inequality $T_{kj}^- \Sigma_{l \in S_{>k}} T_l > L$ holds, it means that the test is too short and the fail in data recovery of the k-th DA (k∈$S_{<i}$, i∈S) in j attempts may not happen. Using the counters approach removes probabilistic character of the error injection module and corresponding CPU overheads, but adds additional memory usage for counters.

During a test, in addition to the errors being injected, a random number of actual errors can appear in natural way. In order to have a desirable controlled probability $P_i$ of errors of type i, an injecting RRV can be corrected after each moment of a real error occurrence. Suppose that $K_i$ errors appear at the moments of time $t_i^{(j)}$, $j = \overline{1, K_i}$, $i = \overline{1, n}$ during a test ($K_i$ are unknown in advance). In order to save an average number of errors equal $N_i = LP_i$ during the test, the probability $P_i^{(j)}$ of error injection after each moment $t_i^{(j)}$ of a real error appearance can be adjusted by the formula:

$$P_i^{(j)} = \frac{N_i - \tilde{N}_i^{(j)}}{L_i^{(j)}}, L_i^{(j)} := L - t_i^{(j)}, j = \overline{1, K_i}, i = \overline{1, n},$$

where $\tilde{N}_i^{(j)}$ is an actual number of all errors (both injected and naturally occurring) to the moment $t_i^{(j)}$, and $L_i^{(j)}$ is a remaining test length after the moment $t_i^{(j)}$. The probability can be adjusted by the formula:

$$P_i^{(j)} = P_i^{(j-1)} - 1/L_i^{(j)}, j = \overline{1, K_i}, P_i^{(0)} := P_i.$$

An example of performing error injection based on read retry vectors will now be described using an example of a defense flow that has two algorithms, and each of them can perform one or two read operations. It should be understood that in other implementations, a defense flow can have any number of defense algorithms, and each defense algorithm can use a one or more read operations, and in some instances, many read operations. Different defense algorithms can also have a different number of read operations than each other. By way of example, the RRVs can be in the form:

$$\vec{R} = (R_0, R_1, R_2) = (0.9, 0.09, 0.009),$$

$$\vec{R}_1^+ = (R_{11}^+, R_{12}^+) = (0.9, 0.1),$$
$$\vec{R}_1^- = (R_{11}^-, R_{12}^-) = (0.1, 0.9),$$

$$\vec{R}_2^+ = (R_{21}^+, R_{22}^+) = (0.5, 0.5),$$
$$\vec{R}_2^- = (R_{21}^-, R_{22}^-) = (0.1, 0.9).$$

Under this example, UECC will happen with probability:

$$R_{UECC} = 1 - R_0 - R_1 - R_2 = 0.001.$$

Assuming there are no real errors during a test, the following steps can be performed to inject errors to reach the different defense stages according to the given probability distributions.

Stage 0: Generate a random number c with possible values 0, 1, 2, 3 in accordance with categorical distribution (e.g., generalized Bernoulli) given by the probabilities (0.9, 0.09, 0.009, 0.001). If c=0 then the error injection is not needed; otherwise, the default read voltage is adjusted to an invalid voltage to cause a read error. If c=i, with i=1 or 2, then the i-th defense algorithm will recover the data. An UECC occurs when c=3.

Stage 1: If c=1, then a Bernoulli distributed random variable $c_1^+$ should be generated in accordance with RRV $c_1^+=1$ with a probability 0.9, and $c_1^+=2$ with a probability 0.1.

Stage 1-1: If c=1, $c_1^+=1$ then the first read operation of the first DA algorithm is performed with the correct voltage.

Stage 1-2: If c=1, $c_1^+=2$ then the first read operation of the first DA algorithm is performed with the wrong voltage. If the first DA algorithm is to continue, then the second read operation of the first DA algorithm is performed with a correct voltage. If the first DA algorithm is complete, one additional artificial read operation is performed with a correct voltage.

Stage 2: If c=2, then two Bernoulli distributed random variables $c_1^-$ and $c_2^+$ are generated independently: $c_1^-$ in accordance with RRV $\vec{R}_2^+$ ($c_1^+=1$ with a probability 0.1, $c_1^+=2$ with a probability 0.9), and $c_2^+$ in accordance with RRV $\vec{R}_2^+$ ($c_2^+=1$ with a probability 0.5, $c_2^+=2$ with a probability 0.5).

Stage 2-1-1: If c=2, $c_1^-=1$, $c_2^+=1$, then the first read operation of the first DA algorithm is performed with a wrong voltage. After that, the first DA algorithm is stopped and the control passes to the second DA algorithm. Then the first read operation of the second DA algorithm is performed with a correct voltage.

Stage 2-1-2: If c=2, $c_1^-=1$, $c_2^+=2$, then the first read operation of the first DA algorithm is performed with a wrong voltage. After that, the first DA algorithm is stopped, and the control passes to the second DA algorithm. The first read operation of the second DA algorithm is performed with a wrong voltage. If after that, the second DA algorithm is to continue, then the second read operation of the second DA algorithm is performed with a correct voltage. If the second DA algorithm is complete, one additional artificial read operation is performed with a correct voltage.

Stage 2-2-1: If c=2, $c_1^-=2$, $c_2^+=1$, then the first read operation of the first DA algorithm is performed with a wrong voltage. If the first DA algorithm is to continue, then the second read operation of the first DA algorithm is performed with a wrong voltage too. If the first DA algorithm is complete after the first read operation, one additional artificial read operation is performed with a wrong voltage. The control then passes to the second DA algorithm. Then the first read operation of the second DA algorithm is performed with a correct voltage.

Stage 2-2-2: If c=2, $c_1^-=2$, $c_2^+=2$, then the procedure for the first DA algorithm is the same as in stage 2-2-1, and for the second DA algorithm is the same as in stage 2-1-2.

Stage 3: If c=3, then two Bernoulli distributed random variables $c_1^-$ and $c_2$ are generated independently: $c_1^-$ in accordance with RRV $\vec{R}_1^-$ ($c_1^-=1$ with a probability 0.1, $c_1^-=2$ with a probability 0.9), and ca in accordance with RRV $\vec{R}_2^-$ ($c_2^-=1$ with a probability 0.1, $c_2^-=2$ with a probability 0.9).

Stage 3-1-1: If c=3, $c_1^-=1$, $c_2^-=1$, then the first read operation of the first DA algorithm is performed with a wrong voltage. After that, the first DA algorithm is stopped, and the control passes to the second DA algorithm. The first read operation of the second DA algorithm is performed with a wrong voltage. After that, the second DA algorithm is stopped with an UECC.

Stage 3-1-2: If c=3, $c_1^-=1$, $c_2^-=2$, then the first read operation of the first DA algorithm is performed with a wrong voltage. After that, the first DA algorithm is stopped, and the control passes to the second DA algorithm. The first read operation of the second DA algorithm is performed with a wrong voltage. If after that, the second DA algorithm is to continue, then the second read operation of the second DA algorithm is performed with a wrong voltage too. If after the first read operation, the second DA algorithm is complete, one additional artificial read operation is performed with a wrong voltage. After that, the second DA algorithm is stopped with an UECC.

Stage 3-2-1: If c=3, $c_1^-=2$, $c_2^-=1$, then the first read operation of the first DA algorithm is performed with a wrong voltage. If after that, the first DA algorithm is to continue, then the second read operation of the first DA algorithm is performed with a wrong voltage too. If after the first read operation, the first DA algorithm is complete, one additional artificial read operation is performed with a wrong voltage. The control then passes to the second DA algorithm. The first read operation of the second DA algorithm is performed with a wrong voltage, and after that, the second DA algorithm is stopped with an UECC.

Stage 3-2-2: If c=3, $c_1^-=2$, $c_2^-=2$, then the procedure for the first DA algorithm is the same as in stage 3-2-1, and for the second algorithm is the same as in stage 3-1-2.

Figure 5:
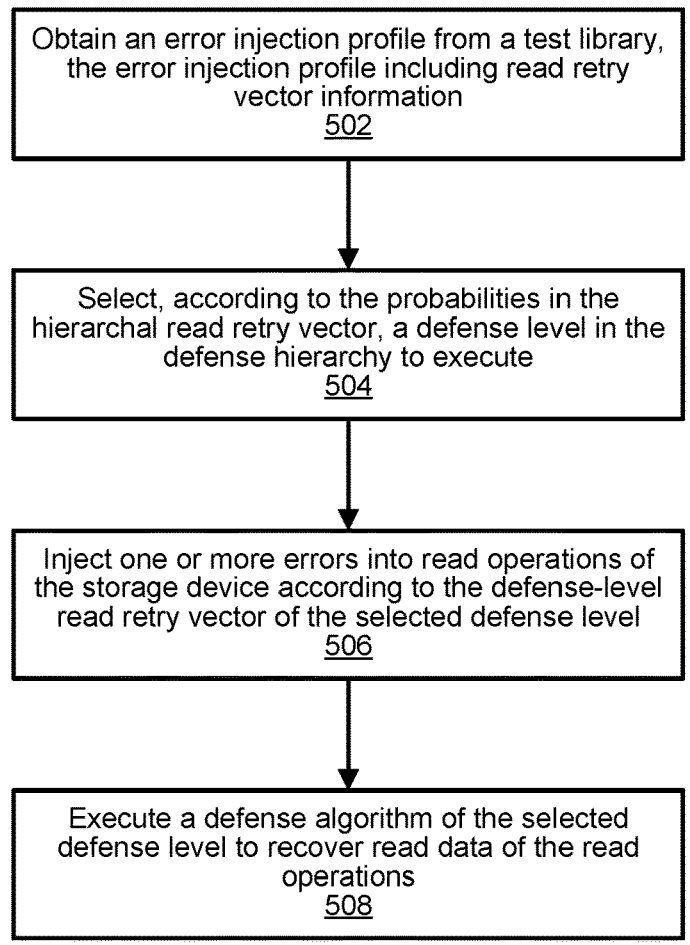
FIG. 5 illustrates a flow diagram of an example of a process for performing error injection, according to some embodiments.

FIG. 5 illustrates a flow diagram of an example of a process 500 for performing error injection when testing a storage device. Process 500 can be performed, for example, by the firmware (e.g., code stored in a non-transitory computer readable storage medium) of a storage device implemented using physical semiconductor memory, or by a simulator component or a storage device model during simulation of a storage device in a simulator. The storage device (or storage device model) can include a memory, a read operation controller, an error injector, as well as other components of a storage device. The read operation controller is operable to set read parameters of the memory, perform read operations in response to a request from the host system, and perform read recovery operations according to a defense hierarchy of defense algorithms to recover erroneous data read from the memory. The error injector can be implemented using firmware, and is operable to inject errors based on read retry vector information.

Process 500 may begin at block 502 by obtaining an error injection profile from a test library. The test library can have multiple error injection profiles, with each of the error injection profiles corresponding to a different set of operating conditions. The operating conditions may include one or more of an age of the memory, a retention time, or an operating temperature. In some implementations, the events of the storage device can be monitored, for example, by an event monitor, and an error injection profile can be selected from the test library based on detection of one or more events occurring in the storage device. The error injection profile obtained from the test library may include read retry vector information.

The read retry vector information may include a hierarchal read retry vector containing a set of probabilities. The probabilities include a probability of successful read without executing a defense algorithm, and a probability of successful data recovery for each defense algorithm of a defense hierarchy implemented for the storage device. The read retry vector information may also include a defense-level read retry vector for each defense algorithm in the defense hierarchy. The defense-level read retry vector for a corresponding defense algorithm may include a probability of successful read for each of one or more read attempts in the corresponding defense algorithm, and a probability of read failure for each of the one or more read attempts in the corresponding defense algorithm.

At block 504, a defense level in the defense hierarchy is selected for execution according to the probabilities in the hierarchal read retry vector. For example, the error injector can generate a random number according to the probabilities of the hierarchal read retry vector, and a defense level in the defense hierarchy is selected for execution based on the random number.

At block 506, one or more errors can be injected into read operations of the storage device according to the defense-level read retry vector of the selected defense level. For example, the error injector can generate one or more Bernoulli distributed random variables according to the defense-level read retry vector to determine which read operation of the selected defense level to inject an error. In some implementations, the errors can be injected at periodic intervals using a set of counters to present the probabilities. The errors can be injected, for example, by changing a read parameter such as a read voltage, a read bias, or other parameter.

At block 508, the defense algorithm of the selected defense level is executed to recover read data. By injecting errors according to the success/failure probabilities, the target defense algorithm in the defense hierarchy can be triggered. Once the target defense algorithm is triggered, the defense algorithm is allowed to run to determine if the defense algorithm can correctly recover the read error. In addition to testing the defense algorithms, utilizing the read retry vector to inject errors according to the success/failure probabilities can also test the transitions between different defense algorithms.

Figure 6:
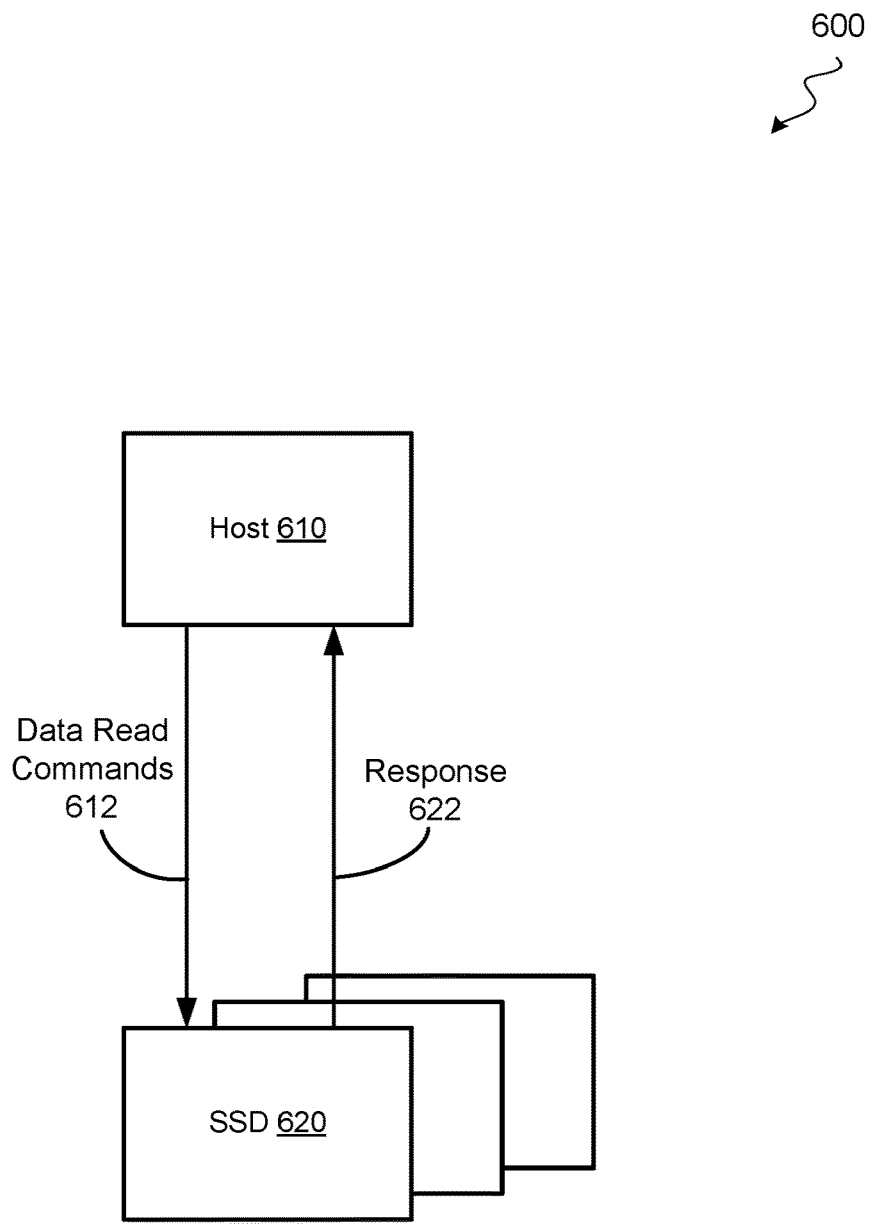
FIG. 6 illustrates an example architecture of a computing system, according to some embodiments.

FIG. 6 illustrates an example architecture of a computing system 600, in accordance with certain embodiments of the present disclosure. In an example, the computer system 600 includes a host 610 and one or more storage devices that can implement the error injection techniques disclosed herein. In the example of FIG. 6, the storage devices are represented as solid state drives (SSDs) 620. The host 610 stores data on behalf of clients, e.g., the SSDs 620. The data is stored in an SSD as codewords for ECC protection. For instance, the SSD can include an error correction system comprising one or more ECC encoders.

The host 610 can receive a request from a client for the client's data stored in the SSDs 1000. In response, the host sends data read commands 612 to the SSDs 620 as applicable. Each of the SSDs 620 processes the received data read command and sends a response 622 to the host 610 upon completion of the processing. The response 622 can include the read data and/or a decoding failure. In an example, each of the SSDs includes at least one ECC decoder. Further, at least one of the SSDs 620 may include a low-density parity check (LDPC) decoder. In particular, some or all of the SSDs 620 may include a LDPC decoder. Processing the data read command and sending the response 622 includes decoding by the ECC decoder(s) the codewords stored in the SSD to output the read data and/or the decoding failure. The SSD may be configured to attempt an initial decoding of its stored codewords using the ECC (e.g., LDPC) decoder. If the initial decoding by the ECC decoder is unsuccessful, the SSD may execute one or more defense algorithms for performing decoding.

Generally, an SSD can be a storage device that stores data persistently or caches data temporarily in nonvolatile semiconductor memory and is intended for use in storage systems, servers (e.g., within data centers), and direct-attached storage (DAS) devices. A growing number of applications need high data throughput and low transaction latency, and SSDs are used as a viable storage solution to increase performance, efficiency, and reliability. SSDs generally use NAND flash memory and deliver higher performance and consume less power than spinning hard-disk drives (HDDs). NAND Flash memory has a number of inherent issues associated with it, the two most important include a finite life expectancy as NAND Flash cells wear out during repeated writes, and a naturally occurring error rate. SSDs can be designed and manufactured according to a set of industry standards that define particular performance specifications, including latency specifications, to support heavier write workloads, more extreme environmental conditions and recovery from a higher bit error rate (BER) than a client SSD (e.g., personal computers, laptops, and tablet computers).

Figure 7:
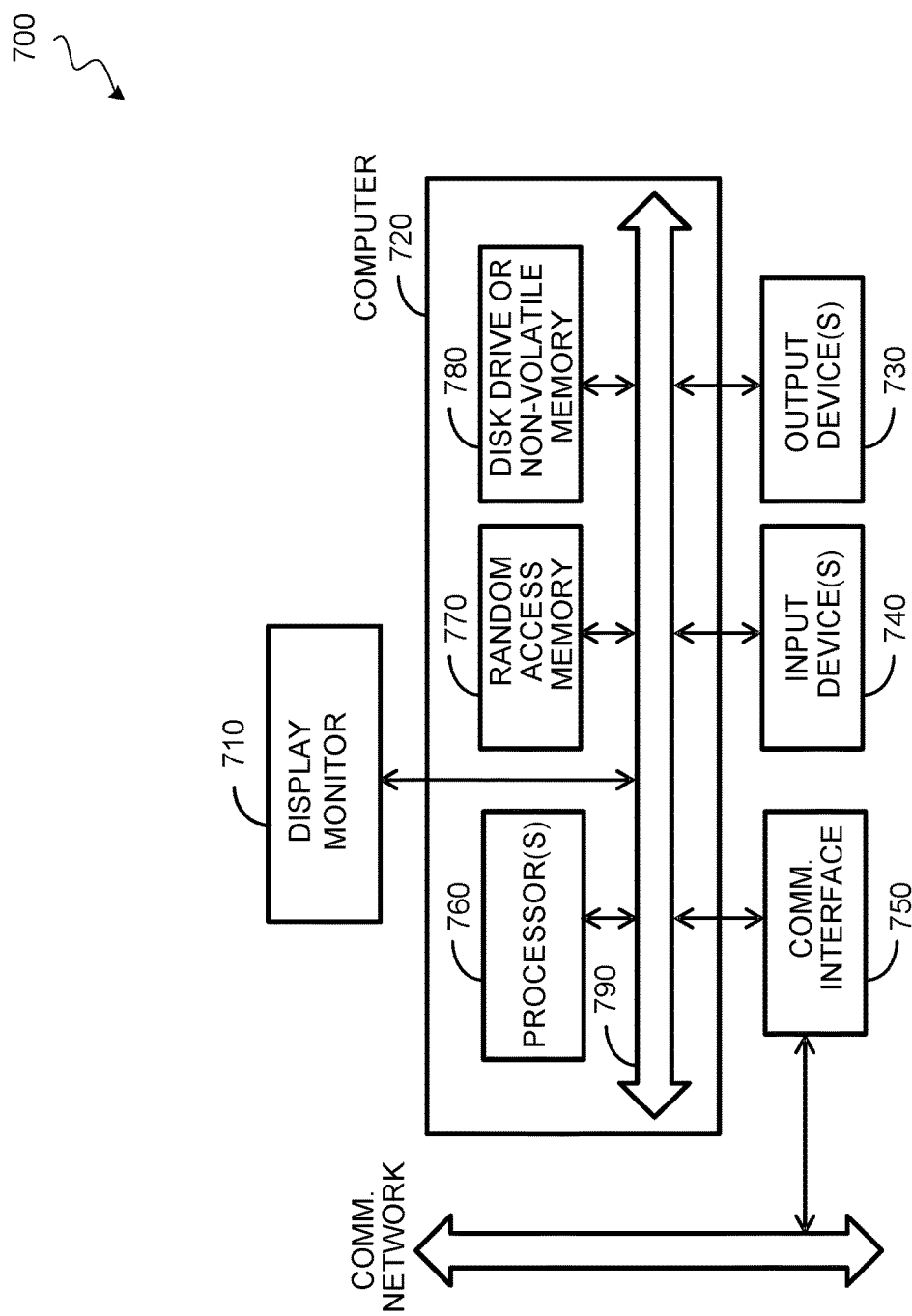
FIG. 7 illustrates a computer system usable for implementing one or more embodiments of the present disclosure.

FIG. 7 illustrates a computer system 700 usable for implementing one or more embodiments of the present disclosure. FIG. 7 is merely an example and does not limit the scope of the disclosure as recited in the claims. As shown in FIG. 7, the computer system 700 may include a display monitor 710, a computer 720, user output devices 730, user input devices 740, a communications interface 750, and/or other computer hardware or accessories.

As shown in FIG. 7, the computer 720 may include one or more processors 760 that communicate with a number of peripheral devices via a bus subsystem 790. These peripheral devices may include the user output devices 730, the user input devices 740, the communications interface 750, and a storage subsystem, such as a random-access memory (RAM) 770 and a disk drive or non-volatile memory 780.

The user input devices 740 include all possible types of devices and mechanisms for inputting information to the computer 720. These may include a keyboard, a keypad, a touch screen incorporated into the display 710, audio input devices such as voice recognition systems, microphones, and other types of input devices. In various embodiments, the user input devices 740 are typically embodied as a computer mouse, a trackball, a track pad, a joystick, a wireless remote, a drawing tablet, a voice command system, an eye tracking system, and the like. The user input devices 740 typically allow a user to select objects, icons, text and the like that appear on the monitor 710 via a command such as a click of a button or the like.

The user output devices 730 include all possible types of devices and mechanisms for outputting information from the computer 720. These may include a display 710, and/or non-visual displays such as audio output devices, etc.

The communications interface 750 provides an interface to other communication networks and devices. The communications interface 750 may serve as an interface for receiving data from and transmitting data to other systems. Embodiments of the communications interface 750 typically include an Ethernet card, a modem (telephone, satellite, cable, ISDN), (asynchronous) digital subscriber line (DSL) unit, FireWire interface, USB interface, and the like. For example, the communications interface 750 may be coupled to a computer network, to a FireWire bus, or the like. In other embodiments, the communications interfaces 750 may be physically integrated on the motherboard of the computer 720, and may be a software program, such as soft DSL, or the like.

In various embodiments, the computer system 700 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

The RAM 770 and the disk drive 780 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 770 and the disk drive 780 may be configured to store the basic programming and data constructs that provide the functionality of the present disclosure.

Software code modules and instructions that provide the functionality of the present disclosure may be stored in the RAM 770 and the disk drive 780. These software modules may be executed by the processor(s) 760. The RAM 770 and the disk drive 780 may also provide a repository for storing data used in accordance with the present disclosure.

The RAM 770 and the disk drive 780 may include a number of memories including a main random-access memory (RAM) for storage of instructions and data during program execution and a read-only memory (ROM) in which fixed non-transitory instructions are stored. The RAM 770 and the disk drive 780 may include a file storage subsystem providing persistent (non-volatile) storage for program and data files. The RAM 770 and the disk drive 780 may also include removable storage systems, such as removable flash memory.

The bus subsystem 790 provides a mechanism for letting the various components and subsystems of the computer 720 communicate with each other as intended. Although the bus subsystem 790 is shown schematically as a single bus, alternative embodiments of the bus subsystem may utilize multiple busses.

It will be readily apparent to one of ordinary skill in the art that many other hardware and software configurations are suitable for use with the present disclosure. For example, the computer 720 may be a desktop, portable, rack-mounted, or tablet configuration. Additionally, the computer 720 may be a series of networked computers. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, and magnetic and optical storage devices, such as disk drives, magnetic tape, CDs, DVDs, or other media, now known or later developed, that are capable of storing code and/or data. Hardware modules or apparatuses described herein include, but are not limited to, ASICs, FPGAs, dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The embodiments disclosed herein are not to be limited in scope by the specific embodiments described herein. Various modifications of the embodiments of the present disclosure, in addition to those described herein, will be apparent to those of ordinary skill in the art from the foregoing description and accompanying drawings. Further, although some of the embodiments of the present disclosure have been described in the context of a particular implementation in a particular environment for a particular purpose, those of ordinary skill in the art will recognize that the disclosure's usefulness is not limited thereto and that the embodiments of the present disclosure can be beneficially implemented in any number of environments for any number of purposes.

What is claimed is:

1. A storage device comprising:
 a memory;
 a read operation controller operable to:
  set read parameters of the memory;

perform read operations in response to read requests from a host system; and perform read recovery operations according to a defense hierarchy that includes a plurality of defense algorithms to recover erroneous data read from the memory; and an error injector operable to:

obtain an error injection profile from a test library; and inject one or more errors during the read operations by modifying a read parameter or a read command result status based on read retry vector information of the error injection profile, wherein the read retry vector information comprises a hierarchal read retry vector containing a plurality of probabilities including a probability of successful read without executing a defense algorithm, and a probability of successful data recovery for each of the defense algorithms in the defense hierarchy.

2. The storage device of claim 1, wherein the read retry vector information further includes a defense-level read retry vector for each of the defense algorithms.

3. The storage device of claim 2, wherein the defense-level read retry vector for a corresponding defense algorithm includes a probability of successful read for each of one or more read attempts in the corresponding defense algorithm, and a probability of read failure for each of the one or more read attempts in the corresponding defense algorithm.

4. The storage device of claim 2, wherein the error injector is operable to generate a random number according to the probabilities of the hierarchal read retry vector to select a defense level in the defense hierarchy to execute.

5. The storage device of claim 4, wherein the selected defense level corresponds to one of the defense algorithms, and the error injector is further operable to generate one or more pseudo random variables with corresponding distribution according to the defense-level read retry vector to determine which read operation to inject an error.

6. The storage device of claim 1, wherein the error injection profile includes read retry vector information for each of a plurality of memory cell types.

7. The storage device of claim 1, wherein the test library includes a plurality of error injection profile, each of the error injection profiles corresponding to a different set of operating conditions.

8. The storage device of claim 7, wherein the operating conditions include one or more of an age of the memory, a retention time, or an operating temperature.

9. The storage device of claim 1, further comprising:

an event monitor operable to select an error injection profile from the test library in response to detecting an event of the storage device.

10. The storage device of claim 1, wherein the error injector is implemented using firmware of the storage device.

11. The storage device of claim 1, wherein the errors are injected by changing a read parameter.

12. An error injection method comprising:

obtaining an error injection profile from a test library, the error injection profile including read retry vector information comprising:

a hierarchal read retry vector containing a plurality of probabilities including a probability of successful read without executing a defense algorithm, and a probability of successful data recovery for each defense algorithm of a defense hierarchy implemented for a storage device; and a defense-level read retry vector for each defense algorithm in the defense hierarchy;

selecting, according to the plurality of probabilities in the hierarchal read retry vector, a defense level in the defense hierarchy to execute;

injecting one or more errors into read operations of the storage device according to the defense-level read retry vector of the selected defense level; and executing a defense algorithm of the selected defense level to recover read data of the read operations.

13. The error injection method of claim 12, wherein the defense-level read retry vector for a corresponding defense algorithm includes a probability of successful read for each of one or more read attempts in the corresponding defense algorithm, and a probability of read failure for each of the one or more read attempts in the corresponding defense algorithm.

14. The error injection method of claim 12, wherein the errors are injected at periodic intervals using a set of counters.

15. The error injection method of claim 12, wherein the storage device is implemented as a physical semiconductor device, or as a device model in a simulator.

16. The error injection method of claim 12, further comprising:

monitoring events of the storage device; and selecting the error injection profile based on detection of one or more events occurring in the storage device.

17. The error injection method of claim 12, wherein the test library includes a plurality of error injection profiles, each of the error injection profiles corresponding to a different set of operating conditions.

18. A non-transitory computer readable storage medium storing instructions, which when executed by a storage device, cause the storage device to perform operations comprising:

selecting an error injection profile from a test library, the error injection profile including read retry vector information comprising:

a hierarchal read retry vector containing a plurality of probabilities including a probability of successful read without executing a defense algorithm, and a probability of successful data recovery for each defense algorithm of a defense hierarchy implemented for the storage device; and a defense-level read retry vector for each defense algorithm in the defense hierarchy;

selecting, according to the plurality of probabilities in the hierarchal read retry vector, a defense level in the defense hierarchy to execute;

injecting one or more errors into read operations of the storage device according to the defense-level read retry vector of the selected defense level; and executing a defense algorithm of the selected defense level to recover read data of the read operations.

19. The non-transitory computer readable storage medium of claim 18, wherein the defense-level read retry vector for a corresponding defense algorithm includes a probability of successful read for each of one or more read attempts in the corresponding defense algorithm, and a probability of read failure for each of the one or more read attempts in the corresponding defense algorithm.

20. The non-transitory computer readable storage medium of claim 18, wherein the error injection profile is selected based on a set of one or more operating conditions including at least one of an age of a memory, a retention time, or an operating temperature.

* * * * *